Jan. 12, 1943.  W. C. GARDINER  2,307,835
MERCURY CELL
Filed Oct. 5, 1938
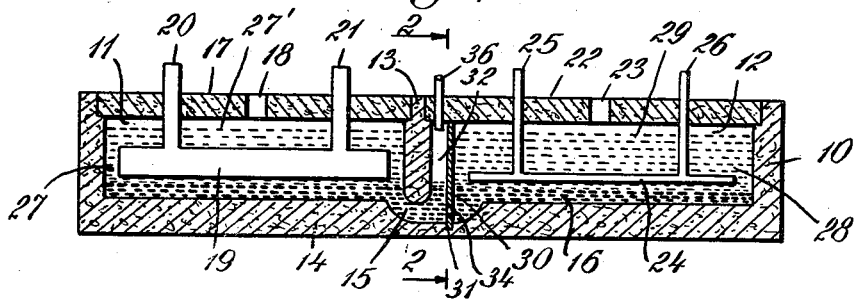
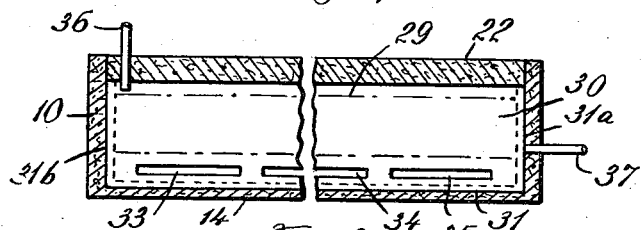
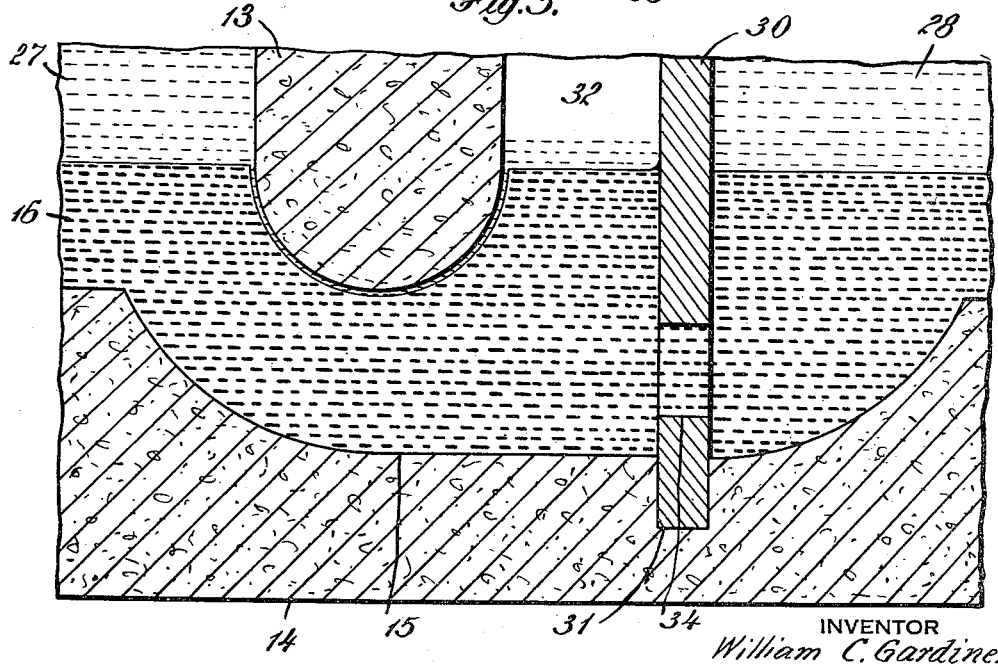
INVENTOR
William C. Gardiner
BY
ATTORNEYS Patented Jan. 12, 1943

2,307,835

UNITED STATES PATENT OFFICE 2,307,835

MERCURY CELL

William C. Gardiner, Niagara Falls, N. Y., assignor to The Mathieson Alkali Works, Inc., New York, N. Y., a corporation of Virginia Application October 5, 1938, Serial No. 233,392

15 Claims. (Cl. 204—220)

This invention relates to mercury seals employed to retain lighter liquids and particularly to seals employed in mercury cells to prevent aqueous electrolyte from passing from one compartment of a cell to another with the mercury.

Mercury cells are constructed in the form of a chamber with walls of insulating material and have upright partitions, also of insulating material, which divide the chamber into two or more compartments. The bottom of the chamber is filled with mercury and there is an opening in the lower portion of the partition below the normal level of the mercury to permit the mercury to flow back and forth from one compartment to the other. Flow of the mercury may be induced by periodically tilting the cell or by pumping.

Into the first compartment of the cell is introduced an aqueous solution of an alkali metal salt, for example, sodium chloride which is to be subjected to electrolysis. The solution overlies the mercury and an anode, preferably of carbon, dips into the solution. When current is passed through the solution in the first compartment, the chloride ions in the solution migrate to the anode, are discharged and collect as chlorine gas which is withdrawn from the compartment. The sodium collects at the underlying mercury layer (which acts as cathode in the first compartment), forming an amalgam. By tilting the cell or by pumping, the sodium amalgam is caused to flow through the opening in the partition into a second compartment of the cell in which is suspended a cathode, preferably of iron, and which contains an aqueous alkaline solution, for example, a solution of sodium hydroxide. In the second compartment, the sodium amalgam acts as anode and gives up its sodium which combines with hydroxyl ions from the water to form sodium hydroxide, hydrogen being released at the cathode and withdrawn from the second compartment.

The sodium chloride electrolyte from the first compartment tends to pass over with the mercury into the second compartment and thus contaminate the sodium hydroxide produced in this compartment. In heretofore customary practice, this contamination has rendered the product unsuitable for many uses. The amount of sodium chloride passing from the first compartment to the second compartment of mercury cell may be substantially reduced by causing the mercury to pass under a dam or baffle made of a material such as nickel which is readily wetted by the mercury. Use of such a dam or baffle, or of a perforated nickel grid interposed in the path of the mercury from one compartment to the other, results in substantial reduction of the amount of sodium chloride or other electrolyte passing through a mercury seal. However, in operating a cell equipped with a mercury seal in which iron or nickel is interposed to hold back the electrolyte, it has been found that the substance in solution in the electrolyte tends to separate as a solid adjacent the iron or nickel. Thus, sodium chloride tends to form an accretion in the mercury seal and interferes with the proper movement of mercury through the seal. As a result of my investigations, I have discovered a method and apparatus whereby the formation of harmful accretions is inhibited, so that the proper movement of mercury through the seal may be maintained.

In accordance with my invention, mercury is removed from a layer thereof overlain by a liquid lighter than mercury by withdrawing the mercury from the layer into a pool and withdrawing the mercury from the pool through a conduit in contact with a material such as iron that is wetted by but is otherwise substantially unaffected by the mercury. In this way, any of the lighter liquid which is dragged into the pool along with the mercury is entrapped at the surface of the pool and may be removed therefrom, for example, by washing.

In the apparatus of my invention (which is adapted to remove foreign substances from mercury) there is a chamber, a pool of mercury in the chamber, and an inlet into the chamber below the level of the pool having a wall of material that is substantially unwetted by mercury, an outlet from the chamber below the level of the pool having a wall of a material that is wetted by mercury but, preferably is otherwise substantially unaffected thereby, means for introducing mercury contaminated by a lighter liquid through the inlet and means for removing mercury from the outlet. Such an apparatus should be provided with means for cleaning the surface of the pool. Thus, if mercury contaminated with a solution of sodium chloride is introduced into the apparatus through the inlet, the solution will tend to be separated from the mercury and collect on top of the pool. In such an apparatus the tendency for accretions to form is reduced. If some incrustations do form, they tend to break loose and to collect at the top of the pool so that both the solution and incrustations may be removed by continuous or periodic flushing of the top of the pool.

The mercury withdrawn from the outlet of the apparatus will be substantially uncontaminated by the lighter liquid. If the mercury is in the form of an amalgam as in the case of the mercury transferred from the anode compartment to the cathode compartment of a mercury cell, substantially no sodium chloride will escape into the cathode compartment where sodium hydroxide is formed.

My invention will be better understood in the light of the following detailed description of an embodiment thereof in a mercury cell. It will be understood, however, that the invention may be employed wherever it is desired to remove a lighter liquid from the mercury passing through a seal.

In the accompanying drawing,

Fig. 1 is an elevation, partly in section of a mercury cell equipped for the practice of my invention;

Fig. 2 is a sectional elevation through the apparatus of Fig. 1, taken along the line 2—2; and Fig. 3 is an enlarged sectional view of a mercury seal in the apparatus of Fig. 1.

Referring now to the drawing, the apparatus comprises a cell 10 of insulating material, such as concrete, having an anode compartment 11 and a cathode compartment 12 divided by a vertical partition 13, also of insulating material such as concrete. It will be noted that concrete is substantially unwetted by mercury. In the bottom 14 of the cell below the partition, there is a slot 15 extending the full length of the partition. A layer of mercury 16 may flow through the slot from anode compartment to cathode compartment as the cell is rocked by conventional means (not shown). The anode compartment is sealed with a cover 17 of insulating material provided with a chlorine outlet 18. An anode 19 of carbon or the like is suspended in the anode compartment by a pair of integrally formed rods 20, 21, which extend through the cover. Similarly, the cathode compartment has a cover 22 of insulating material provided with a hydrogen outlet 23. A cathode 24, for example, an iron grid, is disposed within the cathode compartment and is held in place by a pair of integrally formed rods 25, 26, which project through the cover.

A concentrated aqueous solution of sodium chloride is supplied to and maintained in the anode compartment above the mercury layer to form a pool 27 having a level 27' above the anode, while in the cathode compartment there is likewise a pool 28 of a conductive aqueous solution (say, of sodium hydroxide) maintained at a level 29 above the top of the cathode.

Within the cathode compartment adjacent the partition but spaced therefrom by a short distance, is a vertically disposed plate 30 of iron or other material which is wetted by mercury in preference to being wetted by the material to be removed from the mercury. The plate is fastened tightly into the bottom of the cell in a groove 31 and into the end walls of the cell in grooves 31a, 31b. The plate extends to the top of the cell compartment and so forms a chamber or well 32 between the partition and the plate. Near the bottom of the plate below the mercury level, there is a series of horizontal slots 33, 34, 35, through which the mercury must pass into the cathode compartment.

Means, such as a water pipe 36, is provided for introducing water or other washing fluid into the well near one end of the cell and a drain 37 from the well is provided for discharging the washing fluid. The drain extends through an end wall of the cell remote from the pipe 36 and above the level of the pool of mercury retained in the well.

Current is supplied to the cell by heretofore customary means (not shown).

The slot 15 through which the mercury flows from anode compartment to cathode compartment constitutes an inlet with walls which are substantially unwetted by mercury, through which the mercury may enter the pool in the chamber. The slots in the plate constitute an outlet for the mercury from the pool.

In the operation of the cell, as in heretofore customary operations, electrolysis of the sodium chloride solution in the anode compartment results in deposition of chlorine at the anode, its collection above the liquid level in the compartment and its removal at the chlorine outlet. Sodium from the solution is deposited at the mercury, amalgamates therewith and is carried over into the cathode compartment by the mercury through the pool maintained in the well. The mercury may be caused to move from compartment to compartment by pumping or by rocking of the cell.

As indicated hereinbefore, there is a tendency for the sodium chlorine solution in the anode compartment to be carried over into the cathode compartment by the mercury layer. However, this solution is stopped by the plate wetted with mercury and rises in the well to overlie the mercury pool. There it is trapped and removed by washing or by other convenient means. As shown in Fig. 3, the mercury does not wet the bottom of the partition so that a film of the electrolyte from the anode compartment may creep into the well around the bottom surface of the partition. Perhaps for this reason, the electrolyte tends to collect on the surface of the mercury in the well instead of forming accretions on the iron as described hereinbefore. In any case, the fact remains that with the apparatus of my invention, the tendency for the formation of accretions is diminished, in consequence of which obstructions to the passage of mercury from one compartment to the other do not form.

The partition between the two cells may be formed of any suitable insulating material which does not tend to be wetted by mercury. Most insulating materials are of this character. Thus, concrete or hard rubber may be employed.

The plate which forms the other side of the wall is preferably made of iron, by which I mean iron and its various alloys, or of nickel. However, any solid material which is substantially unattacked by the mercury but to which the mercury tends to adhere in the presence of the electrolyte may be used. Metals such as lead or copper which amalgamate readily with the mercury are not satisfactory.

In the appended claims the word "mercury" is used in a broad sense and is intended to include mercury in the form of an amalgam as in the case of the mercury transferred from the anode compartment to the cathode compartment of a mercury cell.

I claim:

1. In a process in which mercury is removed from a layer thereof overlain by a body of liquid lighter than mercury, the improvement which comprises withdrawing the mercury underneath and in contact with a wall of material which is substantially unwetted by mercury and is wetted by the liquid into a pool of mercury and withdrawing the mercury from the pool underneath and in contact with a wall of material that is wetted by the mercury but is otherwise substantially unaffected thereby.

2. In a process in which mercury is removed from a layer thereof overlain by a liquid lighter than mercury, the improvement which comprises withdrawing the mercury from the layer underneath and in contact with a wall of material that is wetted by the liquid in preference to being wetted by the mercury into a pool of mercury and withdrawing the mercury from below the surface of the pool through a conduit in contact with a substance that is wetted by the mercury in preference to being wetted by the liquid.

3. In a process in which mercury is removed from a layer thereof overlain by a solution of a substance lighter than mercury, the improvement which comprises withdrawing the mercury from below the surface of the layer into a pool, the withdrawal being made through a conduit having an upper wall of material that is wetted by the solution in preference to being wetted by the mercury, withdrawing the mercury from below the surface of the pool in contact with a substance that is wetted by the mercury in preference to being wetted by the solution but is otherwise substantially unaffected thereby, and removing the substance of the solution from the surface of the pool.

4. In a process in which mercury is removed from a layer thereof overlain by a solution of a substance lighter than mercury, the improvement which comprises withdrawing the mercury contaminated with a portion of the solution from below the surface of the layer into a pool, the withdrawal being made through a conduit having an upper wall of material that is wetted by the solution in preference to being wetted by the mercury and withdrawing the mercury from below the surface of the pool underneath a baffle having a surface that is wetted by the mercury in preference to being wetted by the solution, and washing the surface of the pool to remove the substance of the solution therefrom.

5. In a process in which mercury is removed from a layer thereof overlain by a lighter liquid, the improvement which comprises withdrawing the mercury from underneath the lighter liquid through a conduit the walls of which are wetted by the liquid in preference to being wetted by the mercury into a pool, withdrawing the mercury from below the surface of the pool through a conduit having a wall that is wetted by the mercury in preference to being wetted by the lighter liquid and removing the lighter liquid from the surface of the pool.

6. In a process in which mercury is removed from a layer thereof overlain by a body of aqueous solution of a substance, the improvement which comprises withdrawing the mercury contaminated with a portion of the solution from underneath the body into a pool, said withdrawal being made underneath and in contact with a wall that is wetted by the aqueous solution in preference to being wetted by the mercury, withdrawing the mercury from the pool below the surface thereof through a conduit having an upper surface of iron, and removing the substance from the surface of the pool.

7. In a process in which mercury is removed from a layer thereof overlain by a body of aqueous solution of a salt, the improvement which comprises withdrawing the mercury contaminated with a portion of the solution from underneath the body into a pool of the mercury, said withdrawal being made through a conduit having an upper wall of a substance that is wetted by the aqueous solution in preference to being wetted by the mercury, withdrawing the mercury from below the surface of the pool through a conduit having an upper surface of a substance that is wetted by the mercury in preference to being wetted by the solution, and removing the salt from the surface of the pool by washing the surface with water.

8. In apparatus of the class described, the combination which comprises a chamber, a pool of mercury in the chamber, a layer of liquid lighter than mercury overlying and in contact with the pool of mercury, an inlet into the chamber below the level of the pool having an upper wall of a material that is substantially unwetted by mercury but is wetted by the liquid, an outlet from the chamber below the level of the pool having a wall of a material that is wetted by mercury, means for introducing mercury contaminated by a lighter liquid through the inlet, and means for removing mercury through the outlet.

9. In apparatus of the class described, the combination which comprises a chamber, a pool of mercury in the chamber, a layer of liquid lighter than mercury overlying and in contact with the pool of mercury, an inlet into the chamber below the level of the pool having an upper wall of material that is substantially unwetted by mercury but is wetted by the liquid, an outlet from the chamber below the level of the pool having an upper wall of iron, means for introducing the mercury contaminated by a lighter liquid through the inlet and means for removing mercury through the outlet.

10. In apparatus of the class described, the combination which comprises a chamber, a pool of amalgam in the chamber, a layer of aqueous liquid lighter than amalgam overlying the pool of amalgam and in contact therewith, an inlet into the chamber below the level of the pool having an upper wall of material that is substantially unwetted by amalgam but is wetted by the aqueous liquid, an outlet from the chamber below the level of the pool having an upper wall of nickel, means for introducing the mercury contaminated by the aqueous liquid through the inlet and means for removing mercury through the outlet.

11. In apparatus of the class described, the combination which comprises a chamber, a pool of mercury in the chamber, a layer of aqueous liquid lighter than mercury overlying the pool of mercury in contact therewith, an inlet into the chamber below the level of the pool having an upper wall of material that is substantially unwetted by mercury but is wetted by the liquid, an outlet from the chamber below the level of the pool having an upper wall of material that is wetted by mercury in preference to being wetted by the aqueous liquid, means for introducing mercury contaminated by the aqueous liquid through the inlet, means for removing mercury through the outlet and means for cleaning the surface of the pool.

12. In apparatus of the class described, the combination which comprises a chamber, a pool of mercury in the chamber, a layer of aqueous liquid lighter than the mercury overlying the pool of mercury and in contact therewith, an inlet into the chamber below the level of the pool having an upper wall of material that is substantially unwetted by mercury but is wetted by the liquid, an outlet from the chamber below the level of the pool having an upper wall of a material that is wetted by mercury in the presence of the aqueous liquid, means for introducing mercury contaminated with the aqueous liquid through the inlet, and means for removing said aqueous liquid from the top of the pool.

13. In apparatus of the class described, the combination which comprises a chamber, a pool of mercury in the chamber, a layer of aqueous liquid lighter than mercury overlying the pool of mercury and in contact therewith, an inlet into the chamber below the level of the pool having an upper wall of material that is substantially unwetted by mercury but is wetted by the aqueous liquid, an outlet from the chamber below the level of the pool having an upper wall of a material that is wetted by mercury, means for introducing mercury contaminated by the aqueous liquid through the inlet, means for washing said aqueous liquid from the top of the pool and means for removing mercury through the outlet.

14. In a process in which mercury is removed from a layer thereof overlain by and in contact with a liquid lighter than mercury, the improvement which comprises withdrawing the mercury from the layer into a pool, said withdrawal being accomplished underneath and in contact with a wall of material that is substantially unwetted by the mercury but is wetted by the liquid, withdrawing the mercury from the pool through a conduit in contact with a material that is wetted by but is otherwise substantially unaffected by the mercury and is not wetted by the liquid, and removing the liquid from the upper surface of the pool.

15. In a process in which mercury is removed from a layer thereof overlain by and in contact with an aqueous solution of a salt, the improvement which comprises withdrawing the mercury contaminated by the solution from below the surface of the layer into a pool, the withdrawal being made through a conduit having at least an upper wall of a material that is preferentially wetted by the aqueous solution, withdrawing the mercury from the pool from below the surface of the pool through a conduit having at least an upper wall that is wetted by the mercury in preference to being wetted by the solution, and removing the salt from the top of the pool.

WILLIAM C. GARDINER.